US 8,909,628 B1

United States Patent
Kwok et al.

(10) Patent No.: US 8,909,628 B1
(45) Date of Patent: Dec. 9, 2014

(54) DETECTING CONTENT SCRAPING

(71) Applicant: Google Inc., Mountain View, CA (US)

(72) Inventors: Chung Tin Kwok, Mountain View, CA (US); Ryan H. Moulton, Mountain View, CA (US); Zhihuan Qiu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/668,106

(22) Filed: Nov. 2, 2012

Related U.S. Application Data (60) Provisional application No. 61/590,236, filed on Jan. 24, 2012.

(51) Int. Cl.
*G06F 17/30* (2006.01)

(52) U.S. Cl.
CPC ............... *G06F 17/30864* (2013.01)
USPC ............................ 707/723; 707/749

(58) Field of Classification Search
CPC ............... G06F 17/27; G06F 17/2785; G06F 17/30864; H04L 51/12; H04L 12/585
See application file for complete search history.

(56) References Cited

U.S. PATENT DOCUMENTS

| | | | |
|---|---|---|---|
| 5,452,442 A | 9/1995 | Kephart | |
| 8,359,326 B1 | 1/2013 | Garg | |
| 8,412,718 B1 * | 4/2013 | Bilger | 707/749 |
| 8,655,647 B2 | 2/2014 | Moore | |
| 8,707,459 B2 | 4/2014 | Brock | |
| 2009/0193293 A1 * | 7/2009 | Stolfo et al. | 714/26 |
| 2010/0228718 A1 * | 9/2010 | Chen | 707/709 |
| 2012/0041768 A1 * | 2/2012 | Reese | 705/1.1 |

* cited by examiner

*Primary Examiner* — Tony Mahmoudi
*Assistant Examiner* — Umar Mian
(74) *Attorney, Agent, or Firm* — Fish & Richardson P.C.

(57) ABSTRACT

Methods, systems, and apparatus, including computer programs encoded on computer storage media, for identifying a plurality of n-grams in a plurality of resources found in a particular site; determining, for each of the plurality of resources, a count of n-grams that originated in the resource; determining, based on counts of n-grams that originated in the resources, a first aggregate count of n-grams that originated in the particular site; determining a second aggregate count of the plurality of n-grams that were identified in the plurality of resources found in the particular site; and determining, based on the first and second aggregate counts, a site originality score for the particular site.

27 Claims, 3 Drawing Sheets

DETECTING CONTENT SCRAPING

CROSS-REFERENCE TO RELATED APPLICATIONS

This application claims the benefit under 35 U.S.C. §119 (e) of U.S. Provisional Application Ser. No. 61/590,236, filed on Jan. 24, 2012 entitled "DETECTING CONTENT SCRAPING," the entirety of which is hereby incorporated by reference.

BACKGROUND

This specification relates to detection of content scraping.

Content appearing in a resource, e.g., web page, that is found in a particular site can be scraped, e.g., copied, using various techniques. The scraped content can be presented, in its entirety or a portion thereof, in a different site.

SUMMARY

This specification describes a system that can detect scraping, e.g., copying, of content from a site, e.g., a web site or other collection of data resources. The system can determine a site originality score for the site, based in part on the detected scraping, that represents a measure of originality of content presented in resources found in the site. The score can be determined by sampling n-grams from resources found in the site and by computing a ratio of sampled n-grams that originally appeared in the resources to the total number of n-grams that were sampled from the resources. The site originality score for a site can be used as a signal to rank resources, or to rank search results that identify resources, that are found in one site relative to resources found in another site.

In general, one innovative aspect of the subject matter described in this specification can be embodied in methods that include the actions of identifying a plurality of n-grams in a plurality of resources found in a particular site; determining, for each of the plurality of resources, a count of n-grams that originated in the resource; determining, based on counts of n-grams that originated in the resources, a first aggregate count of n-grams that originated in the particular site; determining a second aggregate count of the plurality of n-grams that were identified in the plurality of resources found in the particular site; and determining, based on the first and second aggregate counts, a site originality score for the particular site.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. Identifying a plurality of n-grams in a resource comprises computing, for each n-gram in the resource, a corresponding hash value, and selecting a plurality of n-grams based on their corresponding hash values. Determining a first aggregate count of n-grams that originated in the particular site comprises summing the counts of n-grams that originated in each of the plurality of resources found in the particular site. Determining the site originality score comprises computing a ratio of a numerator and a denominator, wherein the numerator is based on the first aggregate count, and wherein the denominator is based on the second aggregate count.

The ratio is multiplied by a specified value. The ratio is added to a specified value. The ratio is multiplied by a first specified value plus a second specified value. An n-gram is determined to originate in a resource found in a particular site by identifying a URL associated with an earliest crawl time stamp for the n-gram, and determining whether the identified URL matches a URL for the particular site. An n-gram that is determined to originate in a resource in a different site is inherited by the particular site when the n-gram is no longer available in the different site, and where a crawl time stamp for the n-gram in the particular site is the next earliest crawl time stamp for the n-gram.

The subject matter described in this specification can be implemented in particular embodiments so as to realize one or more of the following advantages. Site originality scores representing a measure of originality for sites, e.g., web sites, can be computed. The site originality scores can be used to rank search results according to the web sites in which the resources identified by the results are found. For example, web sites including more original content can be promoted relative to web sites including the content as copied from another source. A site originality score for a site can be used as a term in the computation of scores for resources that are found in the site.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
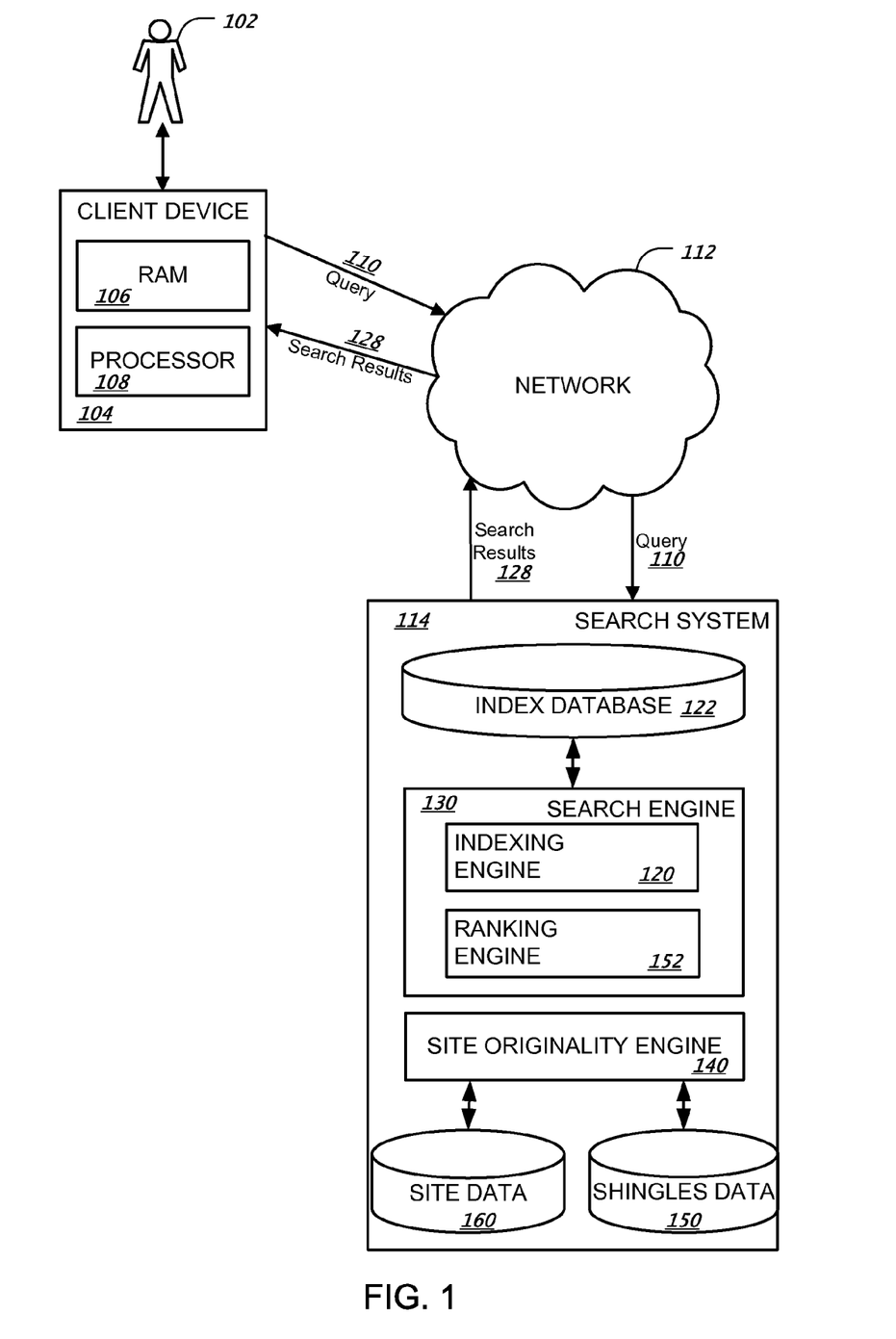
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. For example, the user device 104 can be a computer coupled to the search system 114 through a data communication network 112, e.g., a local area network (LAN) or wide area network (WAN), e.g., the Internet, or a combination of networks. In some cases, the search system 114 can be implemented on the user device 104, for example, if a user installs an application that performs searches on the user device 104. The user device 104 will generally include a memory, e.g., a random access memory (RAM) 106, for storing instructions and data and a processor 108 for executing stored instructions. The memory can include both read only and writable memory. For example, the user device 104 can be a personal computer of some kind, a cloud client device, a smartphone, a tablet, or a personal digital assistant.

The user device 104 can run an application program, e.g., a web browser, that can interact with the search system 114 to display web pages that provide a user interface to the search system 114 for the user 102 of the user device 104.

A user 102 can use the user device 104 to submit a query 110 to a search system 114. A search engine 130 within the search system 114 performs the search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the user device 104 for presentation to the user 102, e.g., as a search results web page to be displayed by a web browser running on the user device 104.

In this specification, the term "database" will be used broadly to refer to any collection of data: the data does not need to be structured in any particular way, or structured at all, and it can be stored on storage devices in one or more locations. Thus, for example, the index database 122 can include multiple collections of data, each of which may be organized and accessed differently. Similarly, in this specification the term "engine" will be used broadly to refer to a software-based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources on the Internet and uses an index database 122 to store the index information, and a ranking engine 152 or other software that generates scores for the resources that satisfy the query 110 and that ranks the resources according to their respective scores.

The search system 114 can include, and can communicate with, a site originality engine 140 that can generate site originality scores for sites. The site originality engine 140 can generate site originality scores based at least in part on shingles data 150 and site data 160. The site originality scores can be used by the ranking engine 152 to adjust scores for the resources that satisfy the query 110, and to rank the resources according to their respective adjusted scores.

Shingles data 150 includes data that describes shingles. Shingles are contiguous subsequences of words that were obtained from resources in a collection of resources. The shingles data 150 includes one or more Internet addresses, e.g., a Uniform Resource Locators (URL), corresponding to a resource in a site in which the shingle was seen in the resource by the search system 114, e.g., while crawling a web corpus, and a time stamp indicating when the shingle was crawled. Additionally, for a particular shingle, the shingles data 150 can indicate the URL in which the shingle was first crawled by the search system 114, e.g., based on the earliest crawl time stamp for the shingle, thus indicating the URL in which the particular shingle originated. The shingles data 150 can also indicate the URL in which the shingle was last crawled, e.g., based on the last crawl time stamp for the shingle.

Site data 160 includes data that the system has that describes particular sites. Site data for a particular site can include resources, e.g., web pages, that are found in the particular site. The system can use the site data 160 to sample n-grams from resources that are found in a particular site. For example, the system can randomly select n-grams from resources found in a particular site. The system can determine, based in part on the shingles data 150, a count of sampled n-grams that originated in resources found in the particular site.

Figure 2:
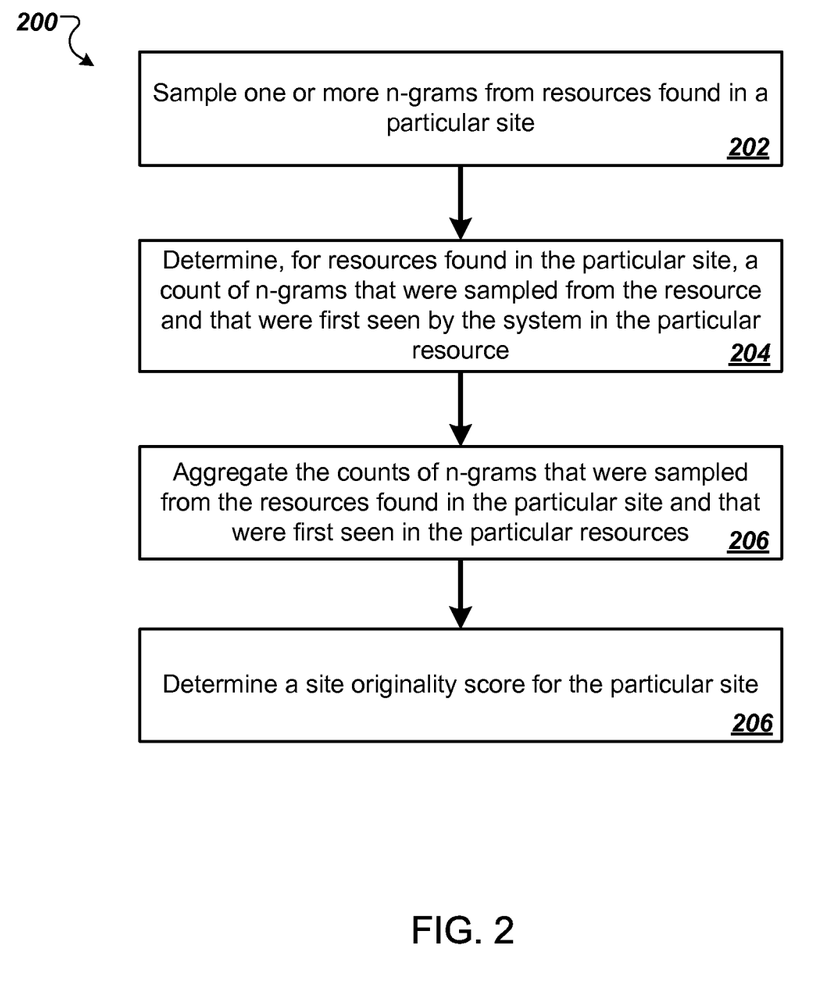
FIG. 2 is a flow diagram of an example process for determining a site originality score.

FIG. 2 is a flow diagram of an example process for determining a site originality score. For convenience, the process 200 will be described as performed by a system including one or more computing devices. For example, a search system 114, as described in reference to FIG. 1, can be used to perform the process 200.

The system samples n-grams from resources found in a particular site (202). The system can sample, from each resource found in the particular site, one or more n-grams, where the number of sampled n-grams can be an appropriate value, e.g., a number from 1 to 100, depending on various criteria, e.g., characteristics of the site or based on empirical data. In some implementations, the system samples, from each resource, all n-grams in the resource. Each n-gram is a contiguous sequence of n items, e.g., a sequence of n words, from a given sequence of text in a resource, where the number of n items can be, e.g., a number from 1 to 10. The value of n can be based on empirical data, for example, to identify an n-value that uniquely identifies original content. For example, sampled 6-grams can provide a greater ability to uniquely identify original content than sampled 2-grams. In some implementations, the system randomly selects one or more n-grams from each resource found in the particular site. For example, the system can randomly sample five 4-grams from each resource found in the particular site.

The sampling of n-grams can be performed more methodically to allow consistency between the sampling of n-grams from resources found in different sites. In some implementations, the system hashes each n-gram in a resource using, e.g., a MinHash algorithm. The n-gram hash values are sorted, e.g., in a descending order, and the n-grams can be selected as samples based in part on their corresponding hash values, e.g., the system can select as samples the n-grams having the top ten highest hash values.

The system determines, for resources found in the particular site, a count of n-grams that were sampled from the resource and that originated in that particular resource (204). The system can determine, for each resource found in the particular site, a count of n-grams that were sampled from the resource and that originated in the particular resource. The system can determine whether an n-gram originated in a resource based on the earliest crawl time stamp for the particular n-gram. For example, an n-gram that was crawled in resources found in site A on January 5, in resources found in site B on January 10, and in resources found in site C on January 15, is first crawled in resources found in site A, since the crawl time stamp of January 5 is earlier than the crawl time stamps for sites B and C.

The system can count the number of n-grams that originated in each resource found in a particular site. For example, for a site that includes three resources, the system can determine that a first resource has five n-grams that were first crawled in the first resource, that a second resource has three n-grams that were first crawled in the second resource, and that a third resource has four n-grams that were first crawled in the third resource. In other words, the system can determine that the five n-grams that were first crawled in the first resource originated in the first resource, that the three n-grams that were first crawled in the second resource originated in the second resource, and that the four n-grams that were first crawled in the third resource originated in the third resource.

The count can be for a particular time window to a current time, e.g., all shingles that were crawled by the system in the preceding day, two days, week or month, for example, or over all shingles data available to the system.

The system can determine a count of n-grams that were sampled from the resources found in the particular site and that originated in those resources by matching each sampled n-gram with shingles, e.g., in the shingles data 150, as described in reference to FIG. 1. In some implementations, an n-gram matches a shingle if the sequence of items in the sampled n-gram is identical, or is similar according to some similarity measure, to the sequence of items in the shingle. For example, in some implementations, a trigram "lazy red dog" matches a shingle "lazy red dog," but does not match a shingle "dog red lazy." In some other implementations, the system determines whether an n-gram matches a shingle by computing a first hash value for the sampled n-gram and a second hash value for the shingle, and by comparing the first and second hash values. In such implementations, the n-gram and the shingle match if the first and second hash values satisfy a threshold.

If a sampled n-gram matches a particular shingle, then the system can determine, using the shingles data, whether the sampled n-gram originated in the resources found in the particular site. In some implementations, the system determines whether the sampled n-gram originated in the resources found in the particular site by determining whether the URL associated with the earliest crawl time stamp for the particular shingle matches the URL for the particular site.

In some cases, the system may determine that the n-gram that was sampled from a resource found in the particular site originated in a different resource that is found in a different site. In such cases, content from the different resource, which includes the sampled n-gram, may have been copied and, therefore, may not be content that originates from the particular site. Accordingly, in such cases, the sampled n-gram may not be included in the count.

In some situations, however, the different site in which the sampled n-gram originated may have moved its content to the particular site, e.g., the different site may have changed its domain name to the particular site. In such situations, the sampled n-gram that originated in the different site may still be considered content that originates from the particular site. In some implementations, the system determines whether the particular site should inherit a sampled n-gram from a different site in which the sampled n-gram originated. In such implementations, the system identifies all sites for which the sampled n-gram has a crawl time stamp prior to the crawl time stamp for the particular site. Once the sites have been identified, the system can determine whether the sampled n-gram is still available in the identified sites. If the sampled n-gram is no longer available in the identified sites, then the system can designate the particular site as the inheritor of the sampled n-gram and the sampled n-gram is deemed to originate from the particular site. In such situations, the sampled n-gram is included in the count.

For example, for a sampled trigram "lazy red dog" that was crawled on the particular site on January 18, the system can identify resources that are found in sites A and B, in which the sampled trigram was also crawled. The system can use, e.g., shingles data, to determine that the sampled n-gram originated in site A on January 3 and was crawled in site B on January 15, both of which are dates prior to the January 18 crawl date for the particular site. The system can determine whether the sampled n-gram is still available in sites A and B. In a case where the sampled n-gram is no longer available in sites A and B, e.g., the system has not identified the n-gram during indexing of resources in the sites A and B, the system can designate the particular site as the inheritor of the sampled trigram and can include the sampled trigram in the count of n-grams that originated in the particular site. In another example case where the sampled n-gram is no longer available in site A, but is available in site B, the system can designate site B as the inheritor of the sampled trigram over the particular site, since the date on which the sampled n-gram was available in site B, e.g., as observed during the crawling of resources, by the system, in site B, is earlier than the date the sampled n-gram was available in the particular site.

In some implementations, the system determines whether a sampled n-gram is still available in a resource by selecting one or more n-grams from the resource, and by comparing the sampled n-gram to the n-grams selected from the resource to determine whether there is a match. The selection of n-grams from the resource can be accomplished by computing hash values for each n-gram in the resource, e.g., using a MinHash algorithm, and by selecting one or more n-grams based on their corresponding hash values. For example, the system can select the n-grams having the top ten highest hash values.

If the sampled n-gram matches an n-gram that was selected from the resource, then the system can determine that the sampled n-gram is still available in the resource. If the sampled n-gram does not match an n-gram that was selected from the resource, then it may be the case that the sampled n-gram is no longer available in the resource or that the sampled n-gram is still available in the resource but was not captured during the selection of n-grams from the resource. In some implementations, when the sampled n-gram does not match an n-gram that was selected from the resource, the system gives the particular site a partial count for the sampled n-gram, e.g., a value from 0 to 1, e.g., 0.1, 0.3, 0.6, 0.9, or 1. The partial count is included in the count of n-grams that originated in the particular site.

A sampled n-gram may be included in the count of n-grams that originated in the particular site despite having been determined, by the system, to originate in a different site in which the sampled n-gram is still available. In some implementations, a sampled n-gram that originated in a site other than the particular site is included in the count of n-grams that originated in the particular site if the time difference between the crawl time stamp for the sampled n-gram in the site and the crawl time stamp for the sampled n-gram in the particular site is within a threshold time. For example, assuming a threshold of one day, a sampled n-gram that was crawled in a first site on January 19 and crawled in a second site on January 20 will be included in the count of n-grams that originated in the second site, since the time difference between January 19 and January 20 is one day.

The system aggregates the counts of n-grams that were sampled from the resources found in the particular site and that originated in the particular resources (206). For example, for a site that includes two resources, the system can determine that a first resource has five n-grams that originated in the first resource and that a second resource has four n-grams that originated in the second resource. The system can aggregate the counts to determine that there are nine n-grams that originated in resources found in the particular site.

The system determines a site originality score for the particular site (208). The site originality score can be determined by computing a ratio of sampled n-grams that originated in the resources found in the particular site to a total count of n-grams that were sampled from the resources found in the particular site. The ratio can be represented by a fraction in which the numerator represents an aggregate count of sampled n-grams that originated in the resources found in the particular site and the denominator represents an aggregate count of n-grams that were sampled from the resources found in the particular site. One example of such a ratio can be expressed as:

$$F/T$$

where F is the aggregate count of sampled n-grams that originated in the resources found in the particular site, and where T is the aggregate count of n-grams that were sampled from the resources found in the particular site.

A site originality score can also be determined by computing a ratio of a numerator and a denominator, where the numerator is based on the aggregate count of sampled n-grams that originated in the resources found in the particular site, and where the denominator is based on the aggregate count of n-grams that were sampled from the resources found in the particular site, where the ratio adjusted, e.g., by being multiplied by a constant, for example, a number greater than or equal to 0. One example of this is:

$$\frac{F}{T} \times C$$

where F is the aggregate count of sampled n-grams that originated in the resources found in the particular site, T is the aggregate count of n-grams that were sampled from the resources found in the particular site, and c is a constant greater than or equal to 0, e.g., 0.1, 0.5, 0.9, or 1.1.

A site originality score can also be determined by computing a ratio of a numerator and a denominator, where the numerator is based on the aggregate count of sampled n-grams that originated in the resources found in the particular site, and where the denominator is based on the aggregate count of n-grams that were sampled from the resources found in the particular site plus a constant. One example of this is:

$$\frac{F}{T} + Z$$

where F is the aggregate count of sampled n-grams that originated in the resources found in the particular site, where T is the aggregate count of n-grams that were sampled from the resources found in the particular site, and where z is a constant greater than or equal to 0, e.g., 0.1, 0.5, 0.9, or 1.1.

A site originality score can also be determined by computing a ratio of a numerator and a denominator, where the numerator is based on the aggregate count of sampled n-grams that originated in the resources found in the particular site, and where the denominator is based on the aggregate count of n-grams that were sampled from the resources found in the particular site, where the ratio adjusted, e.g., by being multiplied by a first constant plus a second constant. One example of this is:

$$\frac{F}{T} \times C + Z$$

where F is the aggregate count of sampled n-grams that originated in the resources found in the particular site, where T is the aggregate count of n-grams that were sampled from the resources found in the particular site, where c is a first constant greater than or equal to 0, e.g., 1, 10, 30, 50, 70, 90, or 100, and where z is a second constant greater than or equal to 0, e.g., 1, 10, 30, 50, 70, 90, or 100.

The system can be configured to treat different kinds of collections of resources as a site. For example, a site can be defined operationally as a collection of resources that are hosted on a particular server. In that case, resources in a site can be accessed through a network, e.g., the Internet, using an Internet address, e.g., a Uniform Resource Locator (URL), corresponding to a server on which the site is hosted. Alternatively or in addition, a site can be defined operationally as the resources in a domain, e.g., "example.com," where the resources in the domain, e.g., "host.example.com/resource1," "www.example.com/folder/resource2," or "example.com/resource3," are found in the site. Alternatively or in addition, a site can be defined operationally using a subdomain, e.g., "www.example.com," where the resources in the subdomain, e.g., "www.example.com/resource1" or "www.example.com/folder/resource2," are found in the site. Alternatively or in addition, a site can be defined operationally using a subdirectory, e.g., "example.com/subdirectory,", where the resources in the subdirectory, e.g., "example.com/subdirectory/resource.html," are found in the site.

Site originality scores can be used by a ranking engine to rank search results. For example, the site originality score for a particular site can be used as a term in the computation of scores for resources that are in the particular site. For example, a site originality score for the site "http://www.example.com" can be used as a term in the computation of a score for a resource "http://www.example.com/resource.html" that is in the site.

Figure 3:
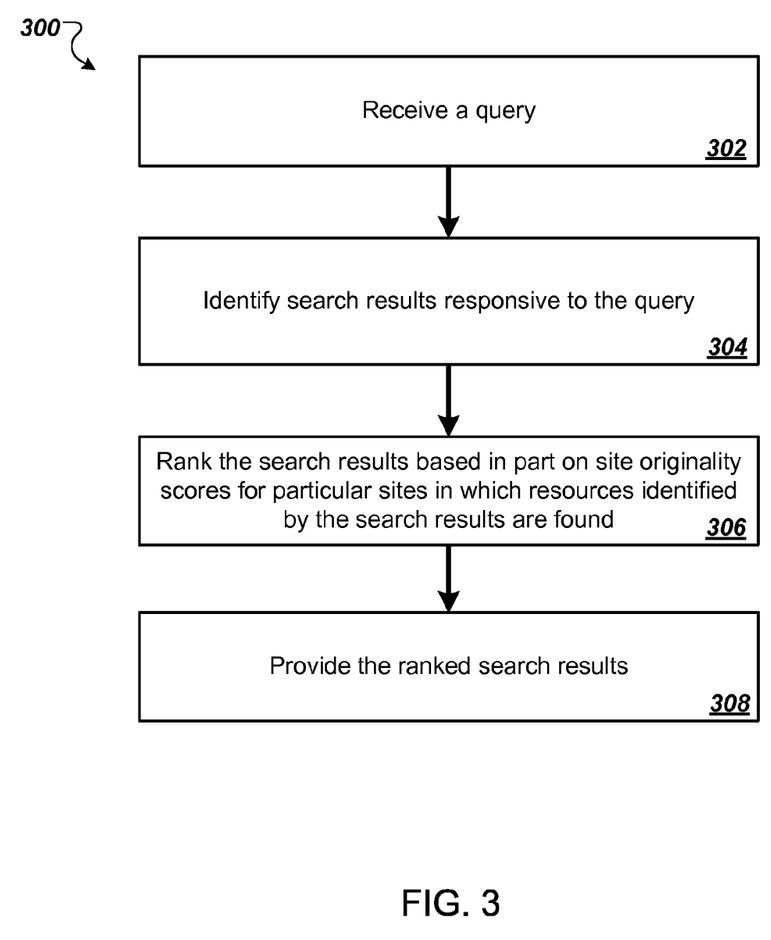
FIG. 3 is a flow diagram of an example process for identifying search results using site originality scores.

FIG. 3 is a flow diagram of an example process for ordering search results responsive to a query based in part on site originality scores. For convenience, the process 300 will be described as performed by a system including one or more computing devices. For example, a search system 114, as described in reference to FIG. 1, can be used to perform the process 300.

The system receives a query (302). For example, the system can receive a query from the user device 104. The system identifies search results that identify resources that are responsive to the query (304).

The system ranks the search results based on various scores, including site originality scores (306). For example, the system can generate scores for the search results using, e.g., the ranking engine 152, for example, quality scores indicating an overall quality of the search results or relevance scores indicating a relevance of a particular search result to the query. In particular, the system can use site originality scores generated for particular sites in which resources identified by the search results are found. The system can use the scores, including the site originality scores, to rank the search results that identify resources in the particular sites. For example, the system can generate an overall score by combining the scores for the search result from the ranking engine and the site originality scores. As another example, the system can adjust a conventional ranking score from the ranking engine using the site originality score.

The system provides the ranked search results that identify resources to a user device (308). For example, the system can respond to the received query by transmitting through a network to the user device 104 for presentation to a user, e.g., as a search results web page to be displayed by a web browser running on the user device 104.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
    identifying a plurality of n-grams in a plurality of resources, wherein each of the resources is associated with a particular website;
    determining, for each of the plurality of resources, a count of n-grams that originated in the resource, wherein each n-gram is determined to have originated in the resource based on an earliest crawl time stamp for the n-gram;
    determining, based on counts of n-grams that originated in the resources, a first aggregate count of n-grams that originated in the particular website;
    determining a second aggregate count of the plurality of n-grams that were identified in the plurality of resources associated with the particular website;
    determining, based on the first and second aggregate counts, a site originality score for the particular website; and
    using the site originality score when ranking search results that identify resources of the particular website responsive to a search query.

2. The method of claim 1, wherein identifying a plurality of n-grams in a resource comprises computing, for each n-gram in the resource, a corresponding hash value, and selecting a plurality of n-grams based on their corresponding hash values.

3. The method of claim 1, wherein determining a first aggregate count of n-grams that originated in the particular website comprises summing the counts of n-grams that originated in each of the plurality of resources associated with the particular website.

4. The method of claim 1, wherein determining the site originality score comprises computing a ratio of a numerator and a denominator, wherein the numerator is based on the first aggregate count, and wherein the denominator is based on the second aggregate count.

5. The method of claim 4, wherein the ratio is multiplied by a specified value.

6. The method of claim 4, wherein the ratio is added to a specified value.

7. The method of claim 4, wherein the ratio is multiplied by a first specified value plus a second specified value.

8. The method of claim 1, wherein an n-gram is determined to originate in a resource associated with a particular website by identifying a URL associated with the earliest crawl time stamp for the n-gram, and determining whether the identified URL matches a URL for the particular website.

9. A computer-implemented method, the method comprising:
    identifying a plurality of n-grams in a plurality of resources found in a particular site;
    determining, for each of the plurality of resources, a count of n-grams that originated in the resource;
    determining, based on counts of n-grams that originated in the resources, a first aggregate count of n-grams that originated in the particular site;
    determining a second aggregate count of the plurality of n-grams that were identified in the plurality of resources found in the particular site; and
    determining, based on the first and second aggregate counts, a site originality score for the particular site,
    wherein an n-gram is determined to originate in a resource found in a particular site by identifying a URL associated with an earliest crawl time stamp for the n-gram, and determining whether the identified URL matches a URL for the particular site, and
    wherein an n-gram that is determined to originate in a resource in a different site is inherited by the particular site when the n-gram is no longer available in the different site, and where a crawl time stamp for the n-gram in the particular site is the next earliest crawl time stamp for the n-gram.

10. A non-transitory computer storage medium encoded with instructions that when executed by one or more computers cause the one or more computers to perform operations comprising:
    identifying a plurality of n-grams in a plurality of resources, wherein each of the resources is associated with a particular website;
    determining, for each of the plurality of resources, a count of n-grams that originated in the resource, wherein each n-gram is determined to have originated in the resource based on an earliest crawl time stamp for the n-gram;
    determining, based on counts of n-grams that originated in the resources, a first aggregate count of n-grams that originated in the particular website;
    determining a second aggregate count of the plurality of n-grams that were identified in the plurality of resources associated with the particular website;
    determining, based on the first and second aggregate counts, a site originality score for the particular website; and
    using the site originality score when ranking search results that identify resources of the particular website responsive to a search query.

11. The computer storage medium of claim 10, wherein identifying a plurality of n-grams in a resource comprises computing, for each n-gram in the resource, a corresponding hash value, and selecting a plurality of n-grams based on their corresponding hash values.

12. The computer storage medium of claim 10, wherein determining a first aggregate count of n-grams that originated in the particular website comprises summing the counts of n-grams that originated in each of the plurality of resources associated with the particular website.

13. The computer storage medium of claim 10, wherein determining the site originality score comprises computing a ratio of a numerator and a denominator, wherein the numerator is based on the first aggregate count, and wherein the denominator is based on the second aggregate count.

14. The computer storage medium of claim 13, wherein the ratio is multiplied by a specified value.

15. The computer storage medium of claim 13, wherein the ratio is added to a specified value.

16. The computer storage medium of claim 13, wherein the ratio is multiplied by a first specified value plus a second specified value.

17. The computer storage medium of claim 10, wherein an n-gram is determined to originate in a resource associated with a particular website by identifying a URL associated with the earliest crawl time stamp for the n-gram, and determining whether the identified URL matches a URL for the particular website.

18. The computer storage medium of claim 17, wherein an n-gram that is determined to originate in a resource in a different website is inherited by the particular website when the n-gram is no longer available in the different website, and where a crawl time stamp for the n-gram in the particular website is the next earliest crawl time stamp for the n-gram.

19. A system comprising:
one or more computers and one or more storage devices storing instructions that are operable, when executed by the one or more computers, to cause the one or more computers to perform operations comprising:
identifying a plurality of n-grams in a plurality of resources, wherein each of the resources is associated with a particular website;
determining, for each of the plurality of resources, a count of n-grams that originated in the resource, wherein each n-gram is determined to have originated in the resource based on an earliest crawl time stamp for the n-gram;
determining, based on counts of n-grams that originated in the resources, a first aggregate count of n-grams that originated in the particular website;
determining a second aggregate count of the plurality of n-grams that were identified in the plurality of resources associated with the particular website;
determining, based on the first and second aggregate counts, a site originality score for the particular website; and
using the site originality score when ranking search results that identify resources of the particular website responsive to a search query.

20. The system of claim 19, wherein identifying a plurality of n-grams in a resource comprises computing, for each n-gram in the resource, a corresponding hash value, and selecting a plurality of n-grams based on their corresponding hash values.

21. The system of claim 19, wherein determining a first aggregate count of n-grams that originated in the particular website comprises summing the counts of n-grams that originated in each of the plurality of resources associated with the particular website.

22. The system of claim 19, wherein determining the site originality score comprises computing a ratio of a numerator and a denominator, wherein the numerator is based on the first aggregate count, and wherein the denominator is based on the second aggregate count.

23. The system of claim 22, wherein the ratio is multiplied by a specified value.

24. The system of claim 22, wherein the ratio is added to a specified value.

25. The system of claim 22, wherein the ratio is multiplied by a first specified value plus a second specified value.

26. The system of claim 19, wherein an n-gram is determined to originate in a resource associated with a particular website by identifying a URL associated with the earliest crawl time stamp for the n-gram, and determining whether the identified URL matches a URL for the particular website.

27. A system comprising:
one or more computers and one or more storage devices storing instructions that are operable, when executed by the one or more computers, to cause the one or more computers to perform operations comprising:
identifying a plurality of n-grams in a plurality of resources found in a particular site;
determining, for each of the plurality of resources, a count of n-grams that originated in the resource;
determining, based on counts of n-grams that originated in the resources, a first aggregate count of n-grams that originated in the particular site;
determining a second aggregate count of the plurality of n-grams that were identified in the plurality of resources found in the particular site; and
determining, based on the first and second aggregate counts, a site originality score for the particular site,
wherein an n-gram is determined to originate in a resource found in a particular site by identifying a URL associated with an earliest crawl time stamp for the n-gram, and determining whether the identified URL matches a URL for the particular site, and
wherein an n-gram that is determined to originate in a resource in a different site is inherited by the particular site when the n-gram is no longer available in the different site, and where a crawl time stamp for the n-gram in the particular site is the next earliest crawl time stamp for the n-gram.

* * * * *